United States Patent
Kim et al.

(10) Patent No.: US 7,158,204 B2
(45) Date of Patent: Jan. 2, 2007

(54) METHOD AND APPARATUS OF FABRICATING LIQUID CRYSTAL DISPLAY PANEL

(75) Inventors: Seong Ho Kim, Kyoungsangbuk-do (KR); Woo Sup Shin, Kyoungsangbuk-do (KR); Yeong Geun Hwang, Kyoungsangbuk-do (KR); Tae Man Kim, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 72 days.

(21) Appl. No.: 10/927,089

(22) Filed: Aug. 27, 2004

(65) Prior Publication Data

US 2005/0046780 A1    Mar. 3, 2005

(30) Foreign Application Priority Data

Aug. 28, 2003  (KR) .................. 10-2003-0059892

(51) Int. Cl.
    *G02F 1/1339*  (2006.01)
(52) U.S. Cl. .................................... 349/155
(58) Field of Classification Search ........ 349/155, 349/187

See application file for complete search history.

(56) References Cited

U.S. PATENT DOCUMENTS

| | | | | |
|---|---|---|---|---|
| 5,946,069 A | * | 8/1999 | Toko | 349/155 |
| 6,064,461 A | * | 5/2000 | Nishida | 349/155 |
| 6,184,956 B1 | * | 2/2001 | Kang et al. | 349/113 |
| 6,424,393 B1 | * | 7/2002 | Hirata et al. | 349/106 |
| 6,836,304 B1 | * | 12/2004 | Sakamaki et al. | 349/106 |

FOREIGN PATENT DOCUMENTS

| | | | |
|---|---|---|---|
| JP | 61-002129 | * | 1/1986 |
| JP | 9-203904 A | | 8/1997 |
| JP | 9-218412 A | | 8/1997 |
| JP | 9-230355 A | | 9/1997 |

* cited by examiner

*Primary Examiner*—Toan Ton
(74) *Attorney, Agent, or Firm*—Birch, Stewart, Kolasch & Birch, LLP

(57) ABSTRACT

A method and an apparatus that can fabricate a liquid crystal display panel capable of selectively forming a spacer at a desired area. The inventive apparatus includes a sprayer to spray adhesive spacers over a substrate having at least one metal pattern, a dryer to dry the adhesive spacers, and a blower to selectively remove the adhesive spacers located at a region non-overlapping the metal pattern.

18 Claims, 10 Drawing Sheets

METHOD AND APPARATUS OF FABRICATING LIQUID CRYSTAL DISPLAY PANEL

This application claims the benefit of Korean patent application No. P2003-59892 filed in Korea on Aug. 28, 2003, which is hereby incorporated by reference.

BACKGROUND OF THE INVENTION

1. Field of the Invention

The present invention pertains to a method and an apparatus to fabricate a liquid crystal display panel, and more particularly, to a method and an apparatus to fabricate a liquid crystal display panel capable of selectively forming a spacer at a desired area.

2. Description of the Related Art

A liquid crystal display device typically controls the light transmittance of liquid crystal by using an electric field to display a picture. To this end, the liquid crystal display device includes a liquid crystal display panel in which liquid crystal cells are arranged in a matrix, and a drive circuit for driving the liquid crystal display panel.

The liquid crystal display panel includes a thin film transistor array substrate and a color filter array substrate, which face each other.

The color filter array substrate includes gate lines and data lines, a thin film transistor of a switching device formed at each crossing of the gate lines and the data lines, a pixel electrode formed at each liquid crystal cell and connected to the thin film transistor, and an alignment film coated on top of them.

The color filter array substrate includes color filters formed at each liquid crystal cell, a black matrix that partitions the color filters and reflects external light, a common electrode to commonly apply a reference voltage to liquid crystal cells, and an alignment film coated on top of them.

Spacers between the color filter array substrate and the thin film transistor array substrate sustain a defined cell gap between the substrates.

Figure 1:
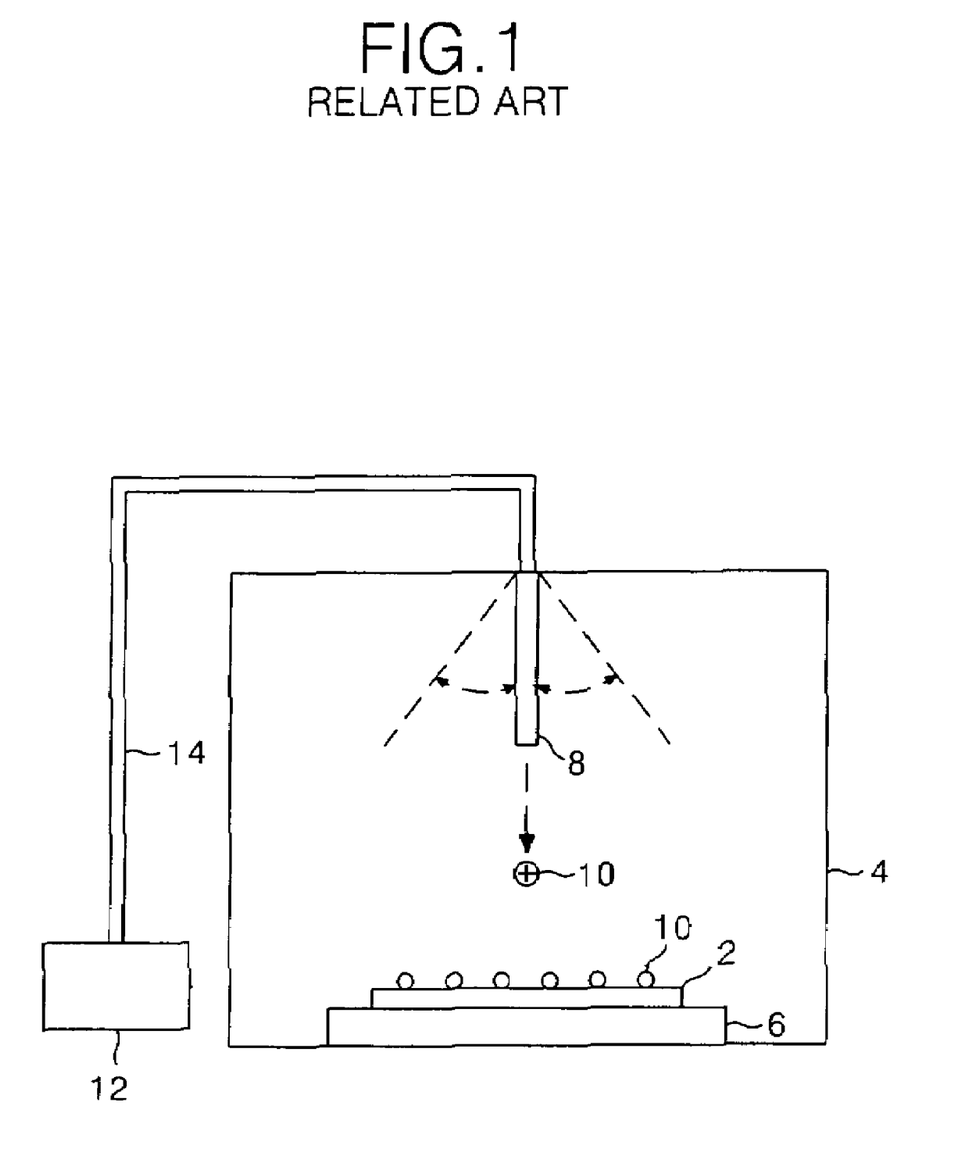
FIG. 1 shows a diagram of a related art spacer spray device.

FIG. 1 shows a diagram representing a related art spacer spray device to form spacers.

Referring to FIG. 1, the related art spacer spray device includes a feed box 12 containing ball spacers 10. A chamber 4 with a nozzle 8 for sprays the ball spacers 10 in the feed box 12 on a substrate 2 through a pipe 14.

The feed box 12 stores the ball spacers 10 destined to be sprayed on the substrate 2. Nitrogen gas $N_2$ injected from the exterior supplies the ball spacers 10 stored in the feed box 12 to the pipe 14.

The chamber 4 contains the substrate 2 mounted on a stage 6, and a nozzle 8 for spraying the ball spacers 10 on the substrate 2. The nozzle 8 located on the upper part of the substrate 2 sprays the ball spacers 10 on the substrate 2 while moving at a designated speed. The substrate 2 is either the thin film transistor array substrate having thin film transistors and pixel electrodes formed thereon or the color filter array substrate having color filters formed thereon.

The operation of the related art spacer spray device is described below.

Figure 2:
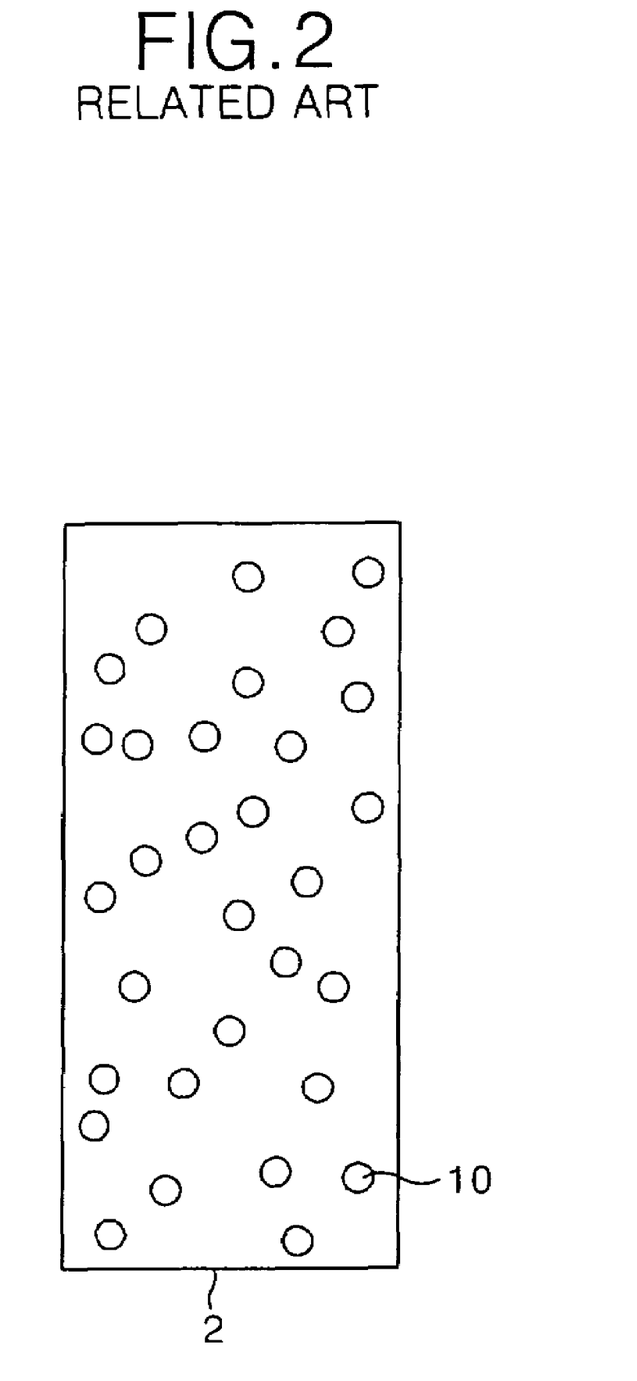
FIG. 2 shows spacers sprayed on a substrate using the spray device shown in FIG. 1.

First, nitrogen gas is supplied to the feed box 12 through a supply line (not shown), and the ball spacers 10 stored in the feed box 12 are supplied to the pipe 14 by the nitrogen gas. At this moment, the ball spacers 10 collide with the inner wall of the pipe 14 while moving along the pipe 14. The ball spacers 10 are thus charged with positive (+) charges by the triboelectric effect. The positively charged ball spacers are sprayed uniformly on the substrate 2 through the nozzle 8, as shown in FIG. 2.

Figure 3:
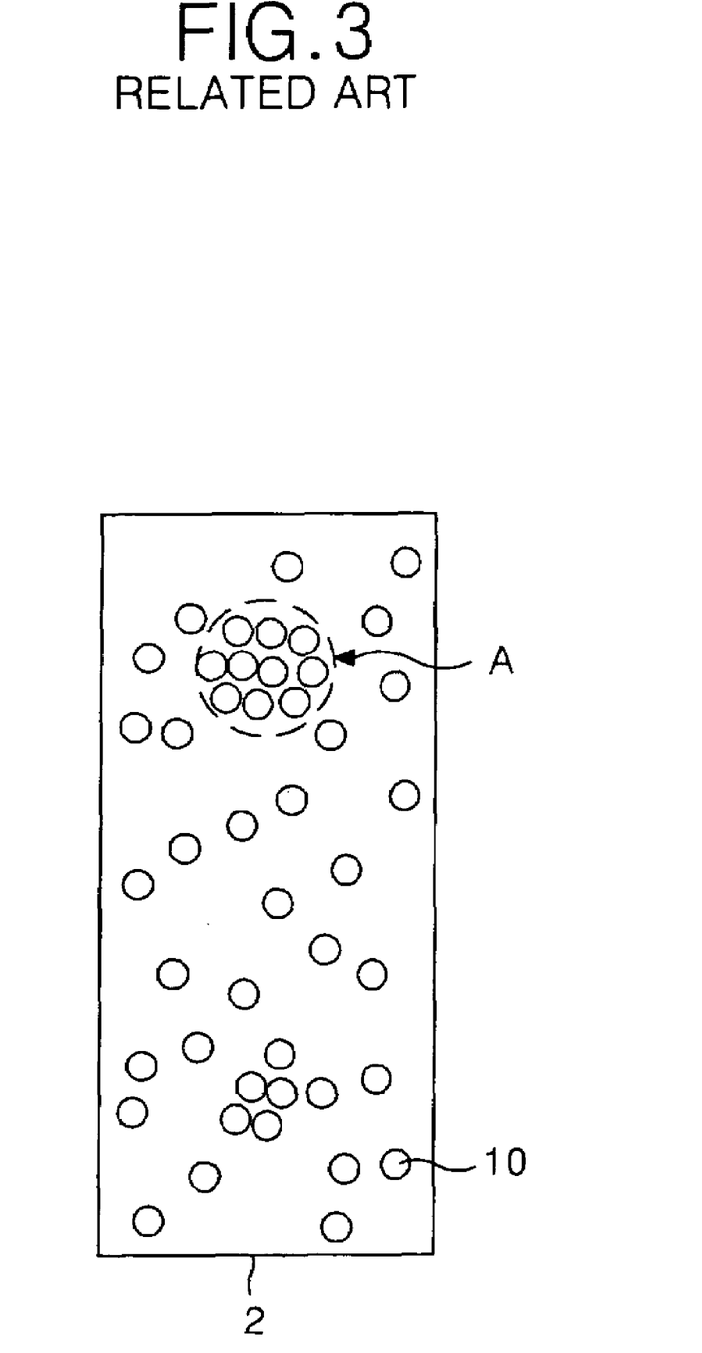
FIG. 3 shows spacers that form a mass that appear as a stain in a display area.

However, if an undesired electric field associates with the metal patterns on the substrate 2 in the chamber 4, then the positive (+) charged ball spacers 10 concentrate on a pattern to which negative (−) voltage on the substrate 2 is applied, as shown in FIG. 3. In this case, if a display area has an area "A" concentrated by the ball spacers 10, the ball spacers 10 appear as stains in the display area.

Further, the ball spacers 10 tend to easily move when impacted from the exterior, and thus an alignment film adjacent to the ball spacers 10 in the display area is damaged. Accordingly, the alignment of the liquid crystal material becomes uneven to cause its brightness to deteriorate. As a result, new spacer technologies are needed to produce high quality displays.

SUMMARY OF THE INVENTION

Accordingly, it is an object of the present invention to provide a method and apparatus to fabricate a liquid crystal display panel capable of selectively forming a spacer at a desired area.

In order to achieve these and other objects of the invention, an apparatus to fabricate a liquid crystal display panel according to the invention includes a sprayer to spray adhesive spacers over a substrate having at least one metal pattern, a dryer to dry the adhesive spacers, and a blower to selectively remove the adhesive spacers located at a region non-overlapping the metal pattern.

In order to achieve these and other objects of the invention, a method of fabricating a liquid crystal display panel includes spraying adhesive spacers on a substrate having at least one metal pattern, drying the sprayed adhesive spacers at a designated temperature, and selectively removing the adhesive spacers located at a region non-overlapping the metal pattern by using a blower.

BRIEF DESCRIPTION OF THE DRAWINGS

These and other objects of the invention will be apparent from the following detailed description of the embodiments of the present invention with reference to the accompanying drawings.

DETAILED DESCRIPTION

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Reference will now be made in detail to the preferred embodiments of the present invention, examples of which are illustrated in the accompanying drawings.

The preferred embodiments of the present invention will be described in detail with reference to FIGS. 4 to 5C.

Figure 4:
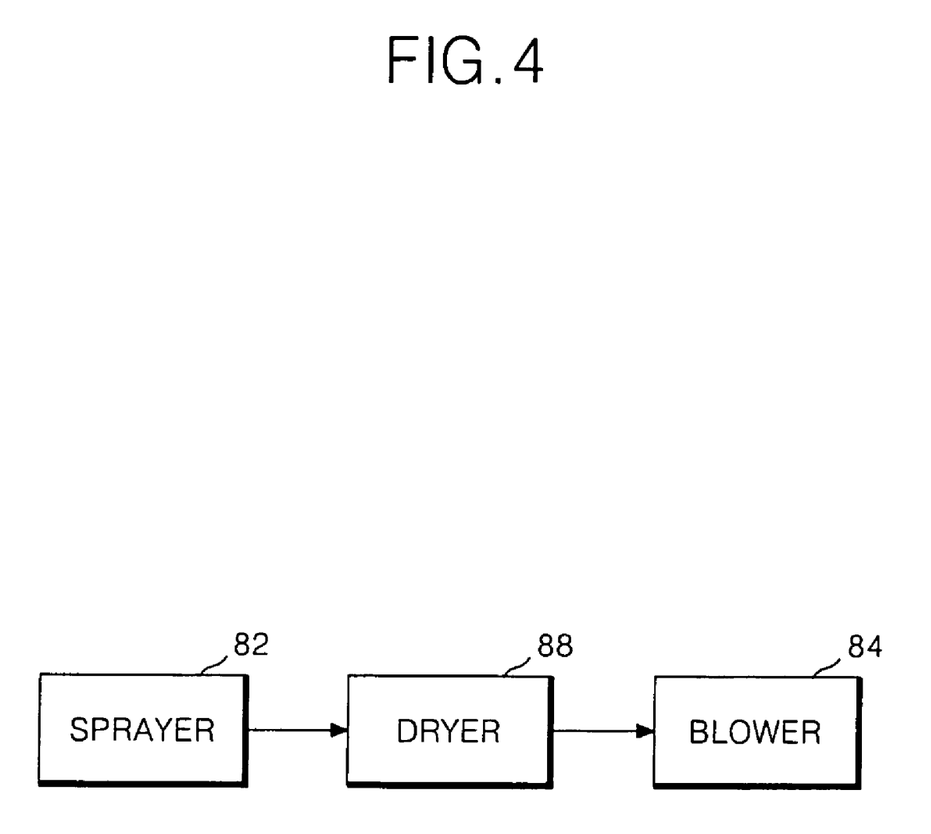
FIG. 4 depicts a block diagram illustrating an apparatus to fabricate a liquid crystal display panel according to the invention.

FIG. 4 shows a block diagram of an apparatus for fabricating a liquid crystal display panel according to the invention. The liquid crystal display panel fabrication apparatus shown in FIG. 4 will be described in reference to FIG. 5A to 5C.

The apparatus shown in FIG. 4 includes a sprayer 82 for spraying adhesive spacers 82 on a substrate 32. A dryer 88 dries the adhesive spacers 80 sprayed on the substrate 32. A blower 84 selectively removes the dried adhesive spacers 80.

The sprayer 82 unevenly sprays the adhesive spacers 80 with the diameter of about 3 μm to 6 μm stored in a feed box (not shown) on the substrate 32. The substrate 32 includes a substrate provided with a conductive layer formed of a conductive metal to modulate the thermal conductivity. For example, the substrate includes a lower substrate provided with a data line, a gate line and a thin film transistor, or an upper substrate provided with a black matrix.

The dryer 88 dries the upper substrate on which the adhesive spacers 80 are sprayed at a designated temperature for a designated time by using infrared rays. However, the invention is not restricted to infrared drying, and other methods of drying can be used. The designated time can be any suitable time, but times between 10 seconds and 24 hours are preferred. At this time, a region of an alignment film 92 overlapping the conductive layer has a thermal conductivity relatively higher than another region of the alignment film without overlapping the conductive layer. When the adhesive spacers 80 are formed on the upper substrate, the conductive layer includes the black matrix. However, when the adhesive spacers are formed on the lower substrate, the conductive layer includes any one of the gate line, the data line and the multiple electrodes of the thin film transistor. Here, the conductive layer serves to raise the thermal conductivity of the alignment film region overlapping the conductive layer. Accordingly, the adhesive spacers adhere relatively well at the alignment film region overlapping the conductive layer.

Meanwhile, if the adhesive spacers are dried by using a hot gas (such as air or nitrogen) instead of the infrared rays, then the adhesive spacers tend to incline toward the progressing direction of the hot gas. Accordingly, the adhesive spacers appear as a stain.

The blower 84 selectively forms the adhesive spacers 80 at a designated location by air streams 86. In other words, the adhesive spacers 80 on the alignment line overlapping the conductive layer have a relatively strong adhesive strength, and the adhesive spacers are thus located on the alignment film. On the other hand, the adhesive spacers on the alignment film non-overlapping the conductive layer have a relatively weak adhesive strength, and the adhesive spacers are thus removed or are moved toward the alignment film overlapping the conductive layer by the blower 84.

Figure 5A:
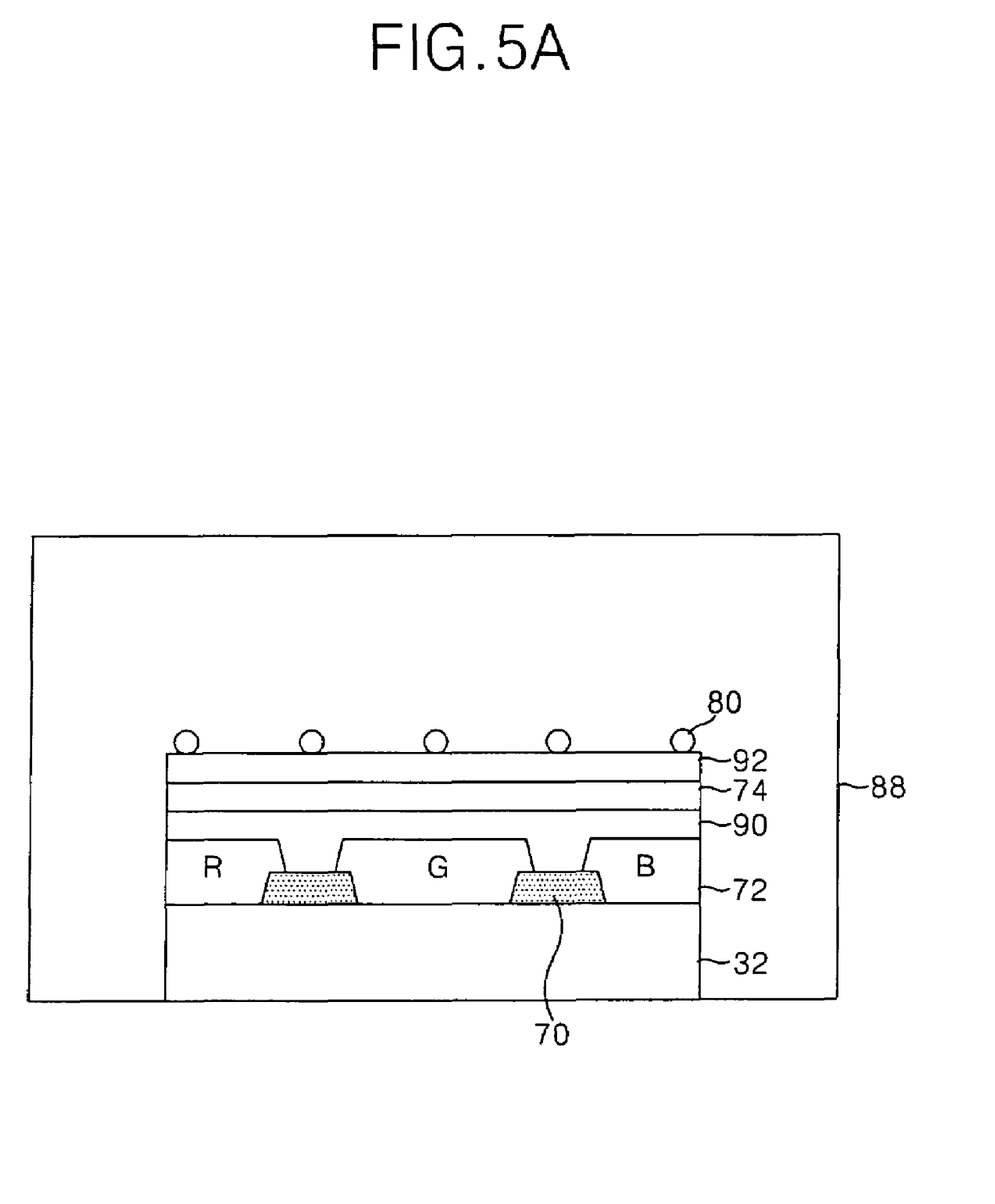
FIGS. 5A to 5C show sectional views illustrating a method of fabricating the liquid crystal display panel according to the invention.
Figure 5B:
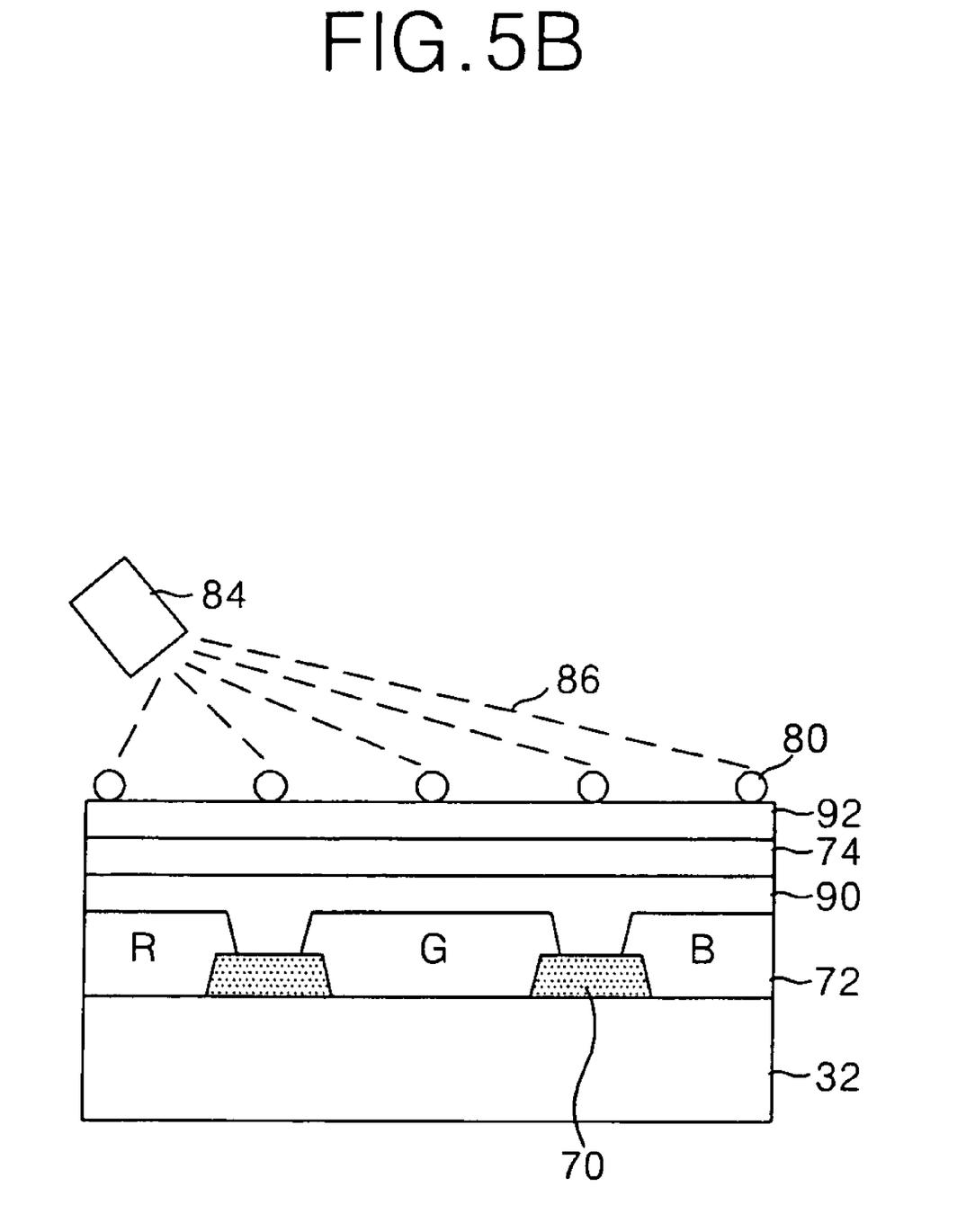
Figure 5C:
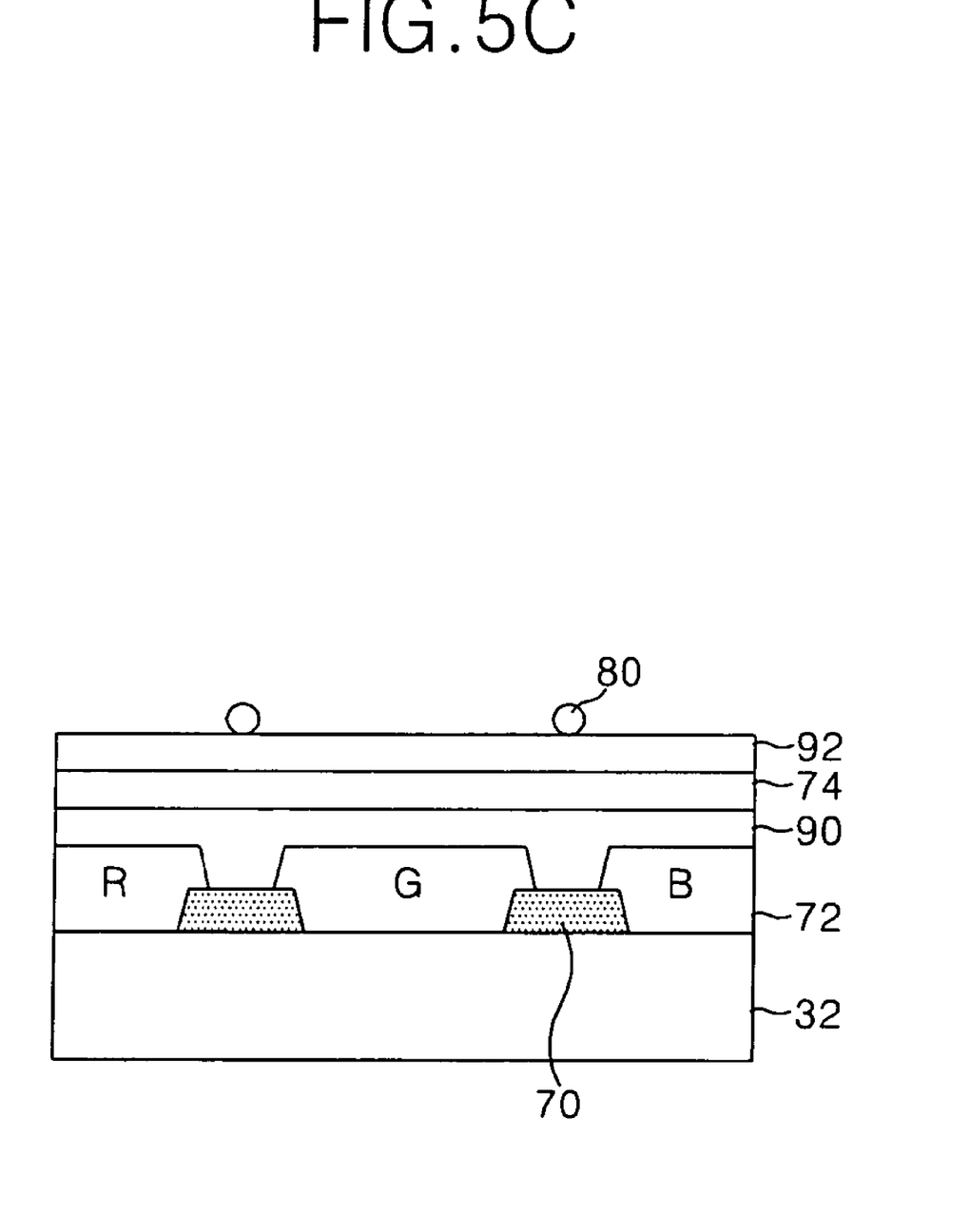

FIGS. 5A to 5C show sectional views illustrating a method of fabricating the liquid crystal display panel according to the invention. In this regard, the following description will be made with respect to an exemplary upper substrate including a black matrix.

First, one prepares an upper substrate 32 over which is formed an upper array that includes a black matrix 70, a color filter 72, an overcoat layer 90, a common electrode 74, and an upper alignment film 92. Adhesive spacers 80 are sprayed by the sprayer 82 over the upper substrate 32. The adhesive spacer 80 includes a ball spacer material encapsulated by an adhesive material. The adhesive material is formed of, e.g., a polyacrylic resin, a methacrylic resin or a polyolefin resin. However, other suitable resins can be used. The adhesive material can also include elastomers, cross-linkers, fillers or accelerants. The ball spacer can be any suitable inorganic or organic material such as glass or plastic beads.

As shown in FIG. 5A, the upper substrate 32 to which the adhesive spacers 80 are sprayed is dried by the dryer 88 at a designated temperature for a designated time. The designated temperature is about 120° C. to 140° C. However, other temperatures can be used within a range of, e.g., 20° C. to 200° C. At this time, the adhesive spacers 80 adhere relatively strongly to the alignment film 92 overlapping the black matrix 70.

Afterwards, the adhesive spacers 80 are selectively removed by using the blower 84 as shown in FIG. 5B. That is, the adhesive spacers 80 on the alignment film 92 non-overlapping the black matrix 70 are removed. On the other hand, the adhesive spacers 80 on the alignment film 92 overlapping the black matrix remain, as shown in FIG. 5C.

Figure 6A:
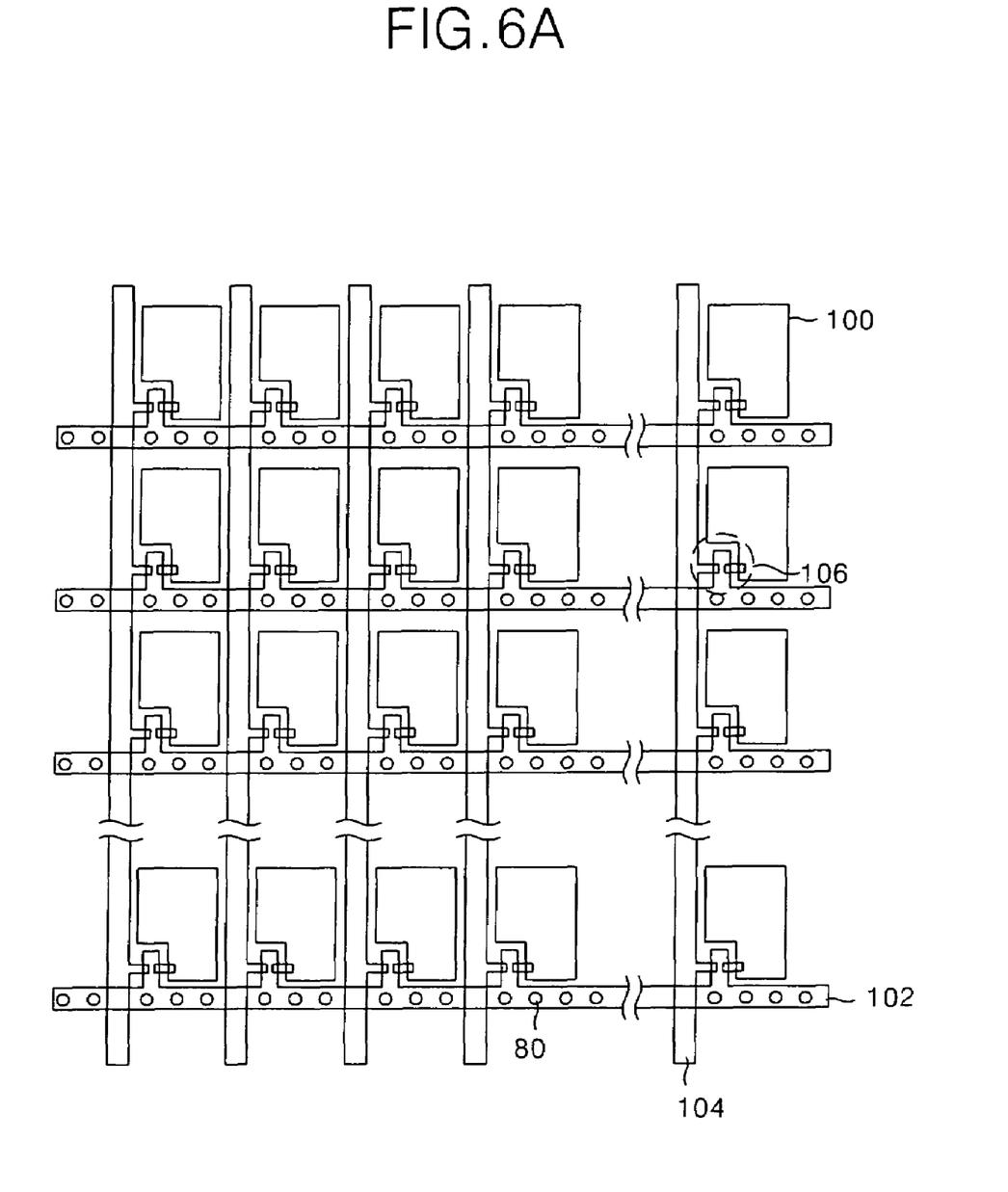
FIGS. 6A to 6C show sectional views illustrating various types of spacers formed on a lower substrate of the liquid crystal display panel.
Figure 6B:
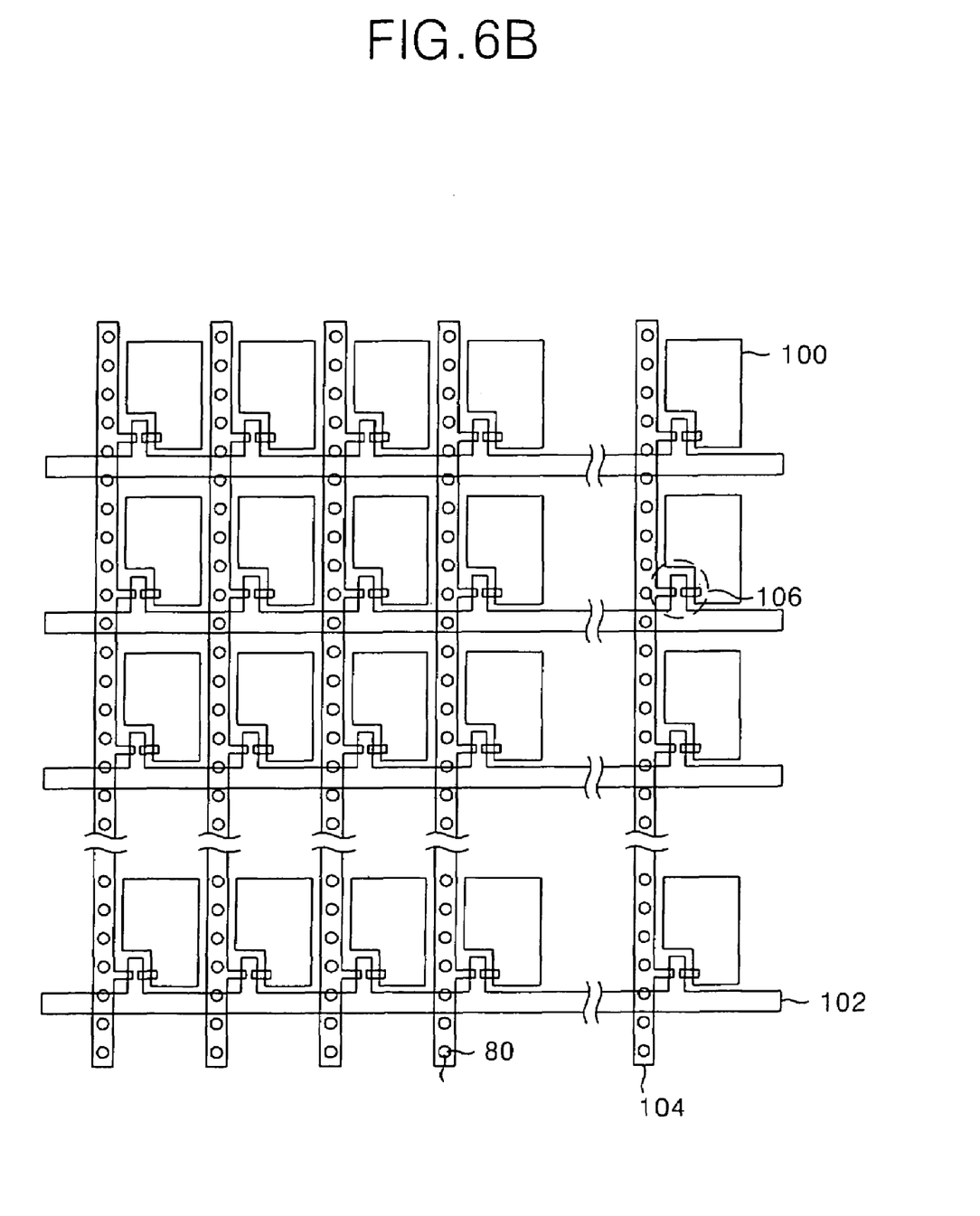
Figure 6C:
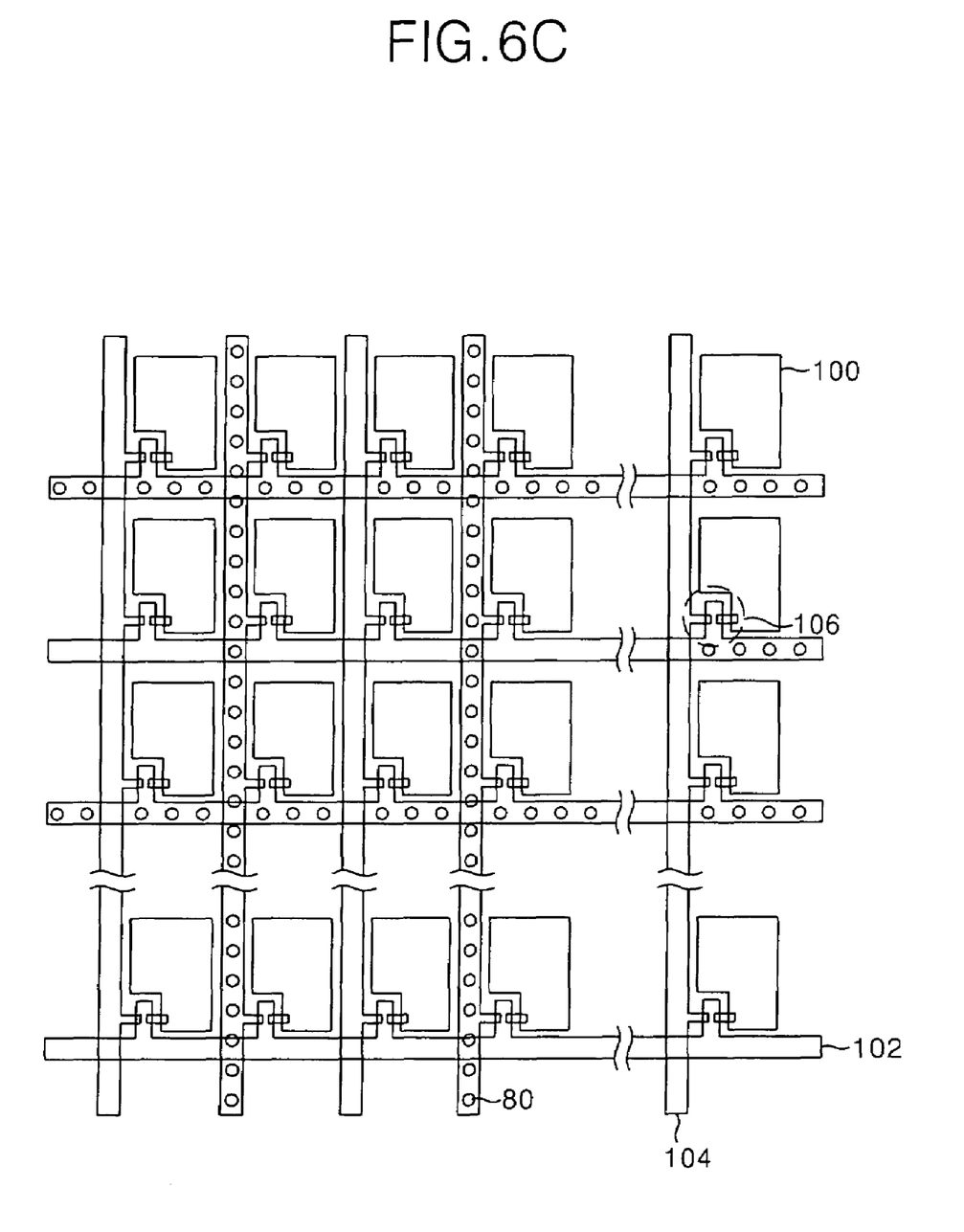

Although the apparatus and the method of fabricating the liquid crystal display panel according to the invention had been described with respect to an exemplary upper substrate provide with the black matrix, the apparatus and the method of fabricating the liquid crystal display panel according to the invention is also applicable to the lower substrate provided with the conductive electrode including the data line 104, the gate line 102 and the thin film transistor 106 as shown in FIGS. 6A to 6C. FIG. 6A shows the selective formation of spacers 80 over the gate line 102. A method of fabricating the adhesive spacers shown in FIG. 6A will be described as follows. The gate line 102 is formed on the lower substrate, and then the adhesive spacers 80 are sprayed on the lower substrate. The sprayed adhesive spacers 80 are dried at a designated temperature. Then, the adhesive spacers 80 of other regions, i.e., a pixel region and the data line 104 region, except for the adhesive spacers 80 of the region overlapping the gate line 102 are selectively removed by the blower.

FIG. 6B shows the selective formation of spacers over the data line 104. A method of fabricating the adhesive spacers shown in FIG. 6B will be described as follows. The data line 104 is formed on the lower substrate, and then the adhesive spacers 80 are sprayed on the lower substrate. The sprayed adhesive spacers 80 are dried at a designated temperature. Then, the adhesive spacers 80 of other regions, i.e., the pixel region and the gate line 102 region, except for the adhesive spacers 80 of the region overlapping the data line 104 are selectively removed by the blower.

FIG. 6C shows the formation of spacers over selected gate lines 102 and data lines 104. A method of fabricating the adhesive spacers shown in FIG. 6C will be described as follows. The gate line 102, the data line 104 crossing the gate line 102 with a gate insulting film positioned therebetween, and a passivation film located so as to cover the data line 104 are sequentially formed. Thereafter, the adhesive spacers 80 are sprayed on the passivation film. The sprayed adhesive spacers 80 are dried at a designated temperature. Then, the adhesive spacers 80 of other regions, i.e., the pixel region, except for the adhesive spacers 80 of the region overlapping the gate line 102 and the data line 104 are selectively removed by the blower.

As described above, according to the inventive apparatus and method of fabricating the liquid crystal display panel, the adhesive spacers sprayed on the substrate are dried at a designated temperature and the spacers relatively strongly adhere at the region overlapping a metal pattern, to thereby selectively form the adhesive spacers at a desired area. Accordingly, the adhesive spacers are selectively located at the region overlapping the metal pattern to make the spacers unmovable at a desired area. In other words, according to the inventive apparatus and method of fabricating the liquid crystal display panel, since the adhesive spacers concentrated in the pixel region among the adhesive spacers charged with positive (+) charges or negative (−) charges by the triboelectric effect are not overlapped with the metal pattern, an adhesive strength becomes weak. Thus, the adhesive spacers concentrated in the pixel region are removed by the blower. Further, it is possible to prevent light leakage by the spacers.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An apparatus for fabricating a liquid crystal display panel comprising:
   a sprayer to spray adhesive spacers over a substrate having at least one metal pattern;
   a dryer to dry the adhesive spacers; and
   a blower to selectively remove the adhesive spacers located at a region non-overlapping the metal pattern.

2. The apparatus according to claim 1, wherein the dryer uses infrared rays to dry the adhesive spacers at a designated temperature.

3. The apparatus according to claim 2, wherein the designated temperature is 120° C. to 140° C.

4. The apparatus according to claim 1, wherein the dryer uses a hot gas to dry the adhesive.

5. The apparatus according to claim 1, wherein the blower forms the adhesive spacers at a designated location by air streams.

6. The apparatus according to claim 1, which further comprises a feed box to store the adhesive spacers.

7. The apparatus according to claim 1, wherein the adhesive spacers comprise a ball spacer material encapsulated by an adhesive material.

8. The apparatus according to claim 7, wherein the adhesive material comprises a polyacrylic resin.

9. A method of fabricating a liquid crystal display panel comprising:
   spraying adhesive spacers on a substrate having at least one metal pattern;
   drying the sprayed adhesive spacers at a designated temperature; and
   selectively removing the adhesive spacers located at a region non-overlapping the metal pattern by using a blower.

10. The method according to claim 9, wherein the designated temperature is 120° C. to 140° C.

11. The method according to claim 9, wherein drying the sprayed adhesive spacers at the designated temperature includes drying the adhesive spacers using infrared rays.

12. The method according to claim 9, wherein the at least one metal pattern is a black matrix.

13. The method according to claim 9, wherein the at least one metal pattern includes at least one of at least one electrode included in a thin film transistor, a gate line, and a data line.

14. The method according to claim 9, wherein the adhesive spacers include a ball spacer encapsulated with an adhesive material.

15. The method according to claim 14, wherein the adhesive material comprises a polyacrylic resin.

16. The method according to claim 9, wherein drying the sprayed adhesive spacers at the designated temperature includes relatively strongly adhering the adhesive spacers overlapping the metal pattern as compared to the adhesive spacers non-overlapping the metal pattern.

17. The apparatus according to claim 7, wherein the adhesive spacers adhere more strongly over a metal region due to triboelectric charges.

18. The method according to claim 14, wherein the adhesive spacers adhere more strongly over a metal region due to triboelectric charges.

* * * * *